US005695862A

United States Patent [19]

Lacz et al.

[11] Patent Number: 5,695,862

[45] Date of Patent: Dec. 9, 1997

[54] PHOTOGRAPHIC PAPER WITH LOW OXYGEN PERMEABILITY

[75] Inventors: David John Lacz, Honeoye Falls; Todd Richard Skochdopole, Rochester; Larry Douglas Hagemeier, Rochester; Anita Marie Fees, Rochester; Brian Thomas, Pittsford; Gary John McSweeney, Hilton, all of N.Y.

[73] Assignee: Eastman Kodak Company, Rochester, N.Y.

[21] Appl. No.: 450,746

[22] Filed: May 25, 1995

Related U.S. Application Data

[62] Division of Ser. No. 378,039, Jan. 24, 1995, Pat. No. 5,567,473, which is a division of Ser. No. 39,340, Apr. 16, 1993, Pat. No. 5,391,473, which is a continuation-in-part of Ser. No. 756,262, Aug. 19, 1991, abandoned.

[51] Int. Cl.$^6$ .............................. B32B 7/02; B32B 23/08

[52] U.S. Cl. ........................ 428/212; 428/36.6; 428/36.7; 428/213; 428/215; 428/216; 428/218; 428/219; 428/340; 428/341; 428/342; 428/511; 428/513; 428/514

[58] Field of Search .................................... 428/340, 511, 428/36.6, 36.7, 341, 342, 513, 514, 212, 213, 215, 216, 218, 219

[56] References Cited

U.S. PATENT DOCUMENTS

| | | | |
|---|---|---|---|
| 2,327,380 | 8/1943 | Toland et al. | 430/531 |
| 2,358,056 | 9/1944 | Clark | 430/536 |
| 3,277,041 | 10/1966 | Sieg et al. | 524/108 |
| 3,364,028 | 1/1968 | Konig | 430/613 |

(List continued on next page.)

FOREIGN PATENT DOCUMENTS

| | | |
|---|---|---|
| 0 085 919 | 7/1983 | European Pat. Off. . |
| 0 225 446 | 6/1987 | European Pat. Off. . |
| 0 391 373 | 10/1990 | European Pat. Off. . |
| 1 584 280 | 1/1991 | France . |
| 3 241 599 | 5/1983 | Germany . |
| 56-085747 | 7/1981 | Japan . |
| 56-087038 | 7/1981 | Japan . |
| 58-121037 | 1/1982 | Japan . |
| 63-198049 | 2/1987 | Japan . |
| 61-119931 | 12/1987 | Japan . |
| 62-49699 | 9/1988 | Japan . |
| 63-285540 | 11/1988 | Japan . |
| 1020541 | 1/1989 | Japan . |
| 62-177931 | 1/1989 | Japan . |
| 1229246 | 9/1989 | Japan . |
| 2059614 | 4/1981 | United Kingdom . |
| 2 109 704 | 6/1983 | United Kingdom . |

OTHER PUBLICATIONS

Patent Abstracts of Japan, vol. 13, No. 587, Dec. 1989 (63 78649 abstract).

Research Disclosure 15162, "Photographic Processes and Products", Nov. 1976, p. 82.

Jame P. Casey, Pulp and Paper Chemistry and Chemical Technology, 2nd Edition, 1967, vol. II, pp. 1140–1143.

Abstract Bulletin of the Institute of Paper Chemistry, vol. 56, No. 8, Feb. 1985, p. 972.

*Primary Examiner*—Leszek Kiliman
*Attorney, Agent, or Firm*—Paul A. Leipold

[57] ABSTRACT

The invention provides photographic paper having increased image stability. The invention is generally accomplished by forming a paper sheet, drying said paper in a first stage to below about 10 percent water, then applying a polyvinyl alcohol solution to both sides of said paper sheet, drying said paper in a second stage to below about 5 percent water, and then applying further polyvinyl alcohol solution to said paper and drying in a third stage. The paper then may be coated to form a silver halide photosensitive color paper. The paper contains between about 4 and about 6 weight percent of polyvinyl alcohol that is concentrated near the surface of said paper. Further, the paper has a oxygen leak rate of less than about 25 cc/m$^2$/day and an oxygen GTR rate of less than about 1 cc/m$^2$/day.

9 Claims, 4 Drawing Sheets

U.S. PATENT DOCUMENTS

| | | | |
|---|---|---|---|
| 3,582,337 | 6/1971 | Griggs et al. | 430/505 |
| 3,582,339 | 6/1971 | Martens et al. | 430/505 |
| 3,669,709 | 6/1972 | Kasugai et al. | 430/496 |
| 3,700,449 | 10/1972 | Lerner | 430/413 |
| 4,072,528 | 2/1978 | Bratt | 430/556 |
| 4,255,490 | 3/1981 | Katsura | 428/483 |
| 4,283,486 | 8/1981 | Aono et al. | 430/505 |
| 4,418,119 | 11/1983 | Morrow et al. | 428/342 |
| 4,419,433 | 12/1983 | Kubbota et al. | 430/206 |
| 4,542,093 | 9/1985 | Suzuki et al. | 430/523 |
| 4,614,681 | 9/1986 | Hayashi et al. | 428/201 |
| 4,645,736 | 2/1987 | Anthonsen et al. | 430/538 |
| 4,667,814 | 5/1987 | Wakamatsu et al. | 206/0.7 |
| 4,731,291 | 3/1988 | Kerkhoff et al. | 428/342 |
| 4,861,696 | 8/1989 | Tamagawa et al. | 430/138 |
| 4,945,025 | 7/1990 | Nakamura | 430/138 |
| 4,994,147 | 2/1991 | Foley et al. | 162/137 |
| 5,234,804 | 8/1993 | Sato et al. | 430/538 |
| 5,391,473 | 2/1995 | Lacz et al. | 428/512 |

FIG. 2
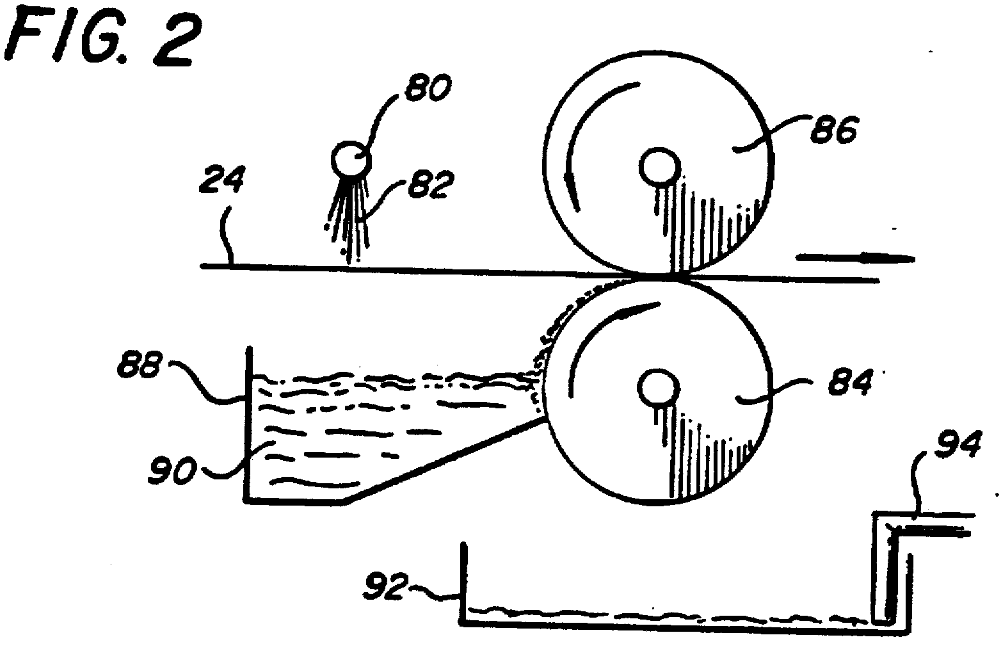
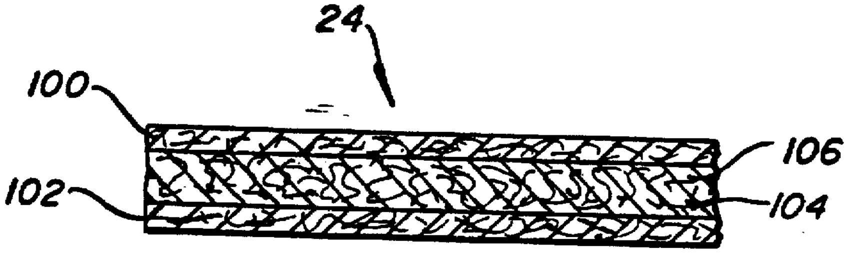
FIG. 3
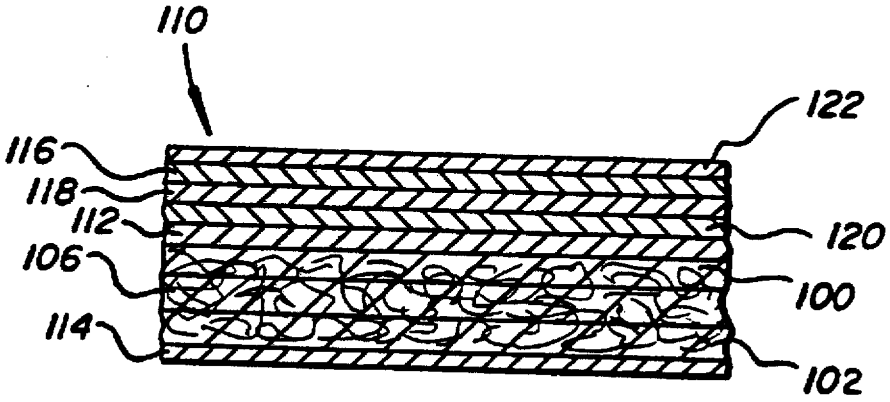
FIG. 4

PHOTOGRAPHIC PAPER WITH LOW OXYGEN PERMEABILITY

CROSS-REFERENCE TO RELATED APPLICATION

This is a divisional of application U.S. Ser. No. 08/378,039 filed Jan. 24, 1995, now U.S. Pat. No. 5,567,473, which is a divisional of U.S. Ser. No. 08/039,340 filed Apr. 16, 1993, now U.S. Pat. No. 5,381,473, which in turn is a continuation-in-part of our earlier filed application U.S. Ser. No. 07/756,262 filed on Aug. 19, 1991, now abandoned.

TECHNICAL FIELD

This invention relates to forming a photographic paper having low oxygen permeability and a photographic element formed utilizing this paper.

BACKGROUND ART

In formation of photographic materials, there is a continuing desire for such materials to remain uniform over time both prior to exposure and after exposure and development. It is particularly desirable in photographic papers that photographs remain stable when displayed. In order to accomplish this, there has been a continued desire for more stable colors. There has also been a desire to provide increased stability to present color photographs by treating the supports for the images. Such treatments prevent transmission of gases that would react with colorants. Placing overcoats over the images also prevents transmission of oxygen that would react with the colorants of photographs.

It is disclosed in U.S. Pat. No. 4,861,696—Tamagawa et al that the wood pulp of a paper may be partially replaced with a synthetic pulp to lower the oxygen permeability. U.S. Pat. No. 3,364,028—Konig discloses prevention of yellow fog formation by coating a baryta layer.

U.S. Pat. No. 4,283,496—Aono et al discloses the formation of a photographic layer having a single layer of polyvinyl alcohol polymer or other polymer that lowers oxygen transmission through said paper.

U.S. Pat. No. 3,582,337—Griggs et al and U.S. Pat. No. 3,582,339—Martens et al disclose various protective layers for photographic papers.

U.S. Pat. No. 2,358,056—Clark discloses a photographic paper having a layer of barium sulfate dispersed in polyvinyl alcohol between the photographic emulsion and the paper.

U.S. Pat. No. 3,277,041—Sieg et al discloses the use of a cross-linked polyvinyl alcohol polymer to increase the water resistance of a photographic paper.

While the life of photographic images has increased, there still remains a need for improvement in stability of photographic images. It is particularly desirable that an increase in the photographic image life be obtained without necessity to reformulate color image couplers which have been balanced for pleasing color rendition and acceptable sensitometric performance.

THE INVENTION

It is an object of the invention to overcome disadvantages of prior photographic papers and photographic elements.

It is an object of the invention to provide photographic paper having increased light image stability.

It is another object of the invention to produce photographs having more neutral fade and, therefore, a longer useful life.

These and other objects of the invention are generally accomplished by forming a paper sheet, drying said paper in a first stage to below about 10 percent water, then applying a polyvinyl alcohol solution to both sides of said paper sheet, drying said paper in a second stage to below about 5 percent water, and then applying further polyvinyl alcohol solution to said paper and drying in a third stage. The paper then may be coated with emulsions to form a silver halide photosensitive color paper. The paper preferably contains between about 4 and about 6 percent by weight of polyvinyl alcohol that is concentrated near the surface of said paper. Further, the paper has an oxygen leak rate of less than about 25 $cc/m^2/day$ and an oxygen gas transmission rate of less than about 1 $cc/m^2/day$.

BRIEF DESCRIPTION OF DRAWINGS

FIG. 2 illustrates an alternate apparatus and method for applying polyvinyl alcohol to the paper.

FIG. 3 is a cross section of a paper of the invention.

FIG. 4 is a cross section of a photographic element of the invention.

MODES FOR CARRYING OUT THE INVENTION

The invention has numerous advantages over prior processes and products. The process allows the impregnation of sufficient polyvinyl alcohol polymer to reduce oxygen transmission without interfering with the coating of the normal polyethylene layer that serves as a base for the photosensitive emulsion layers on the photographic paper. Further, the process of the invention allows formation of a photographic element that has improved image stability without a change in the image-forming materials. Further, the photographic elements of the invention have the advantage that the photographic paper may be formed utilizing substantially the current paper formation process, with the addition of the polyvinyl alcohol polymer solution application apparatus. These and other advantages will be apparent from a detailed description of the invention below. Another advantage is that the oxygen barrier of the invention does not contribute to curl of the photographic paper.

Figure 1A:
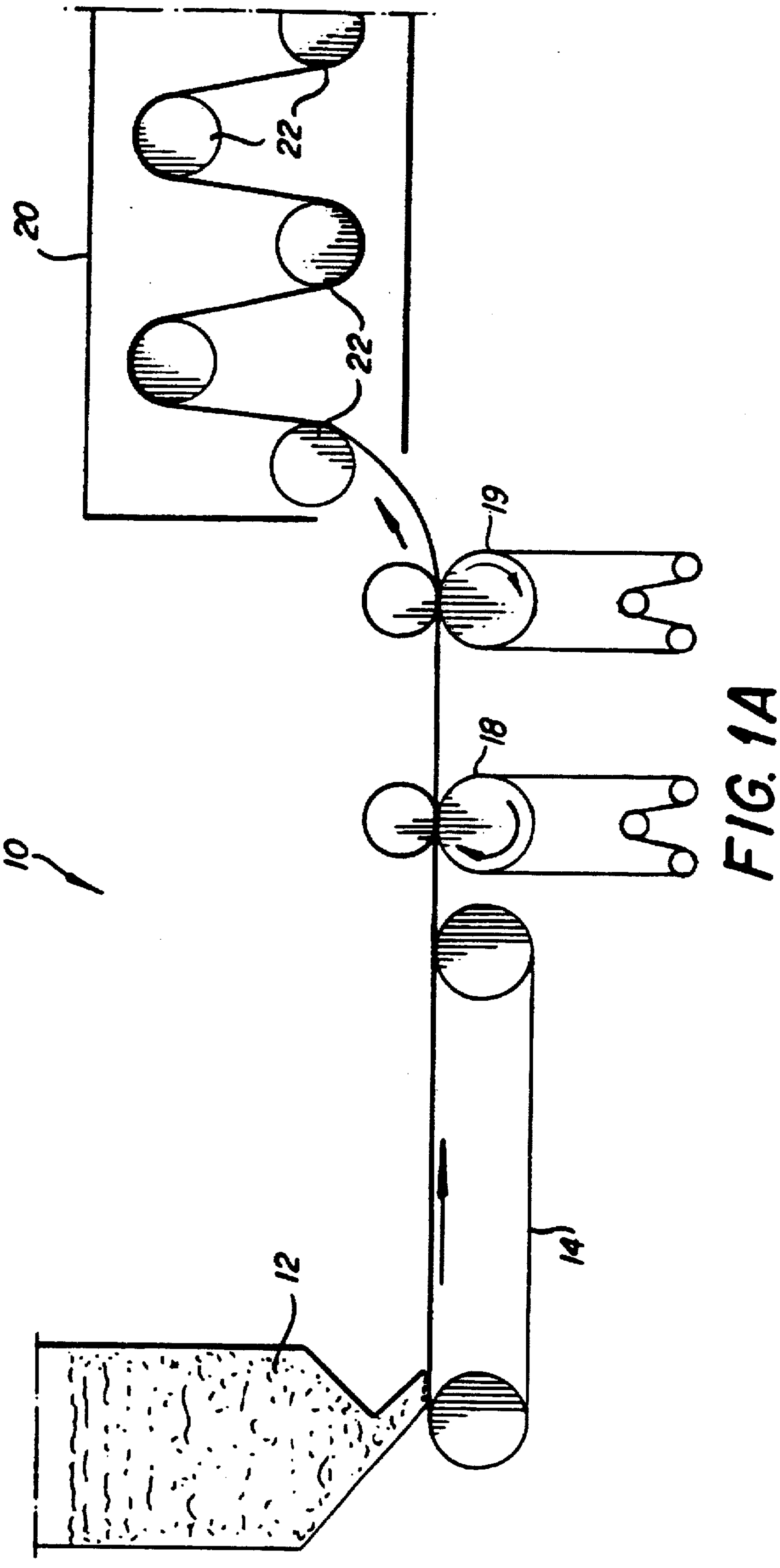
FIGS. 1A, 1B, and 1C illustrate schematically the apparatus and method of the invention.
Figure 1B:
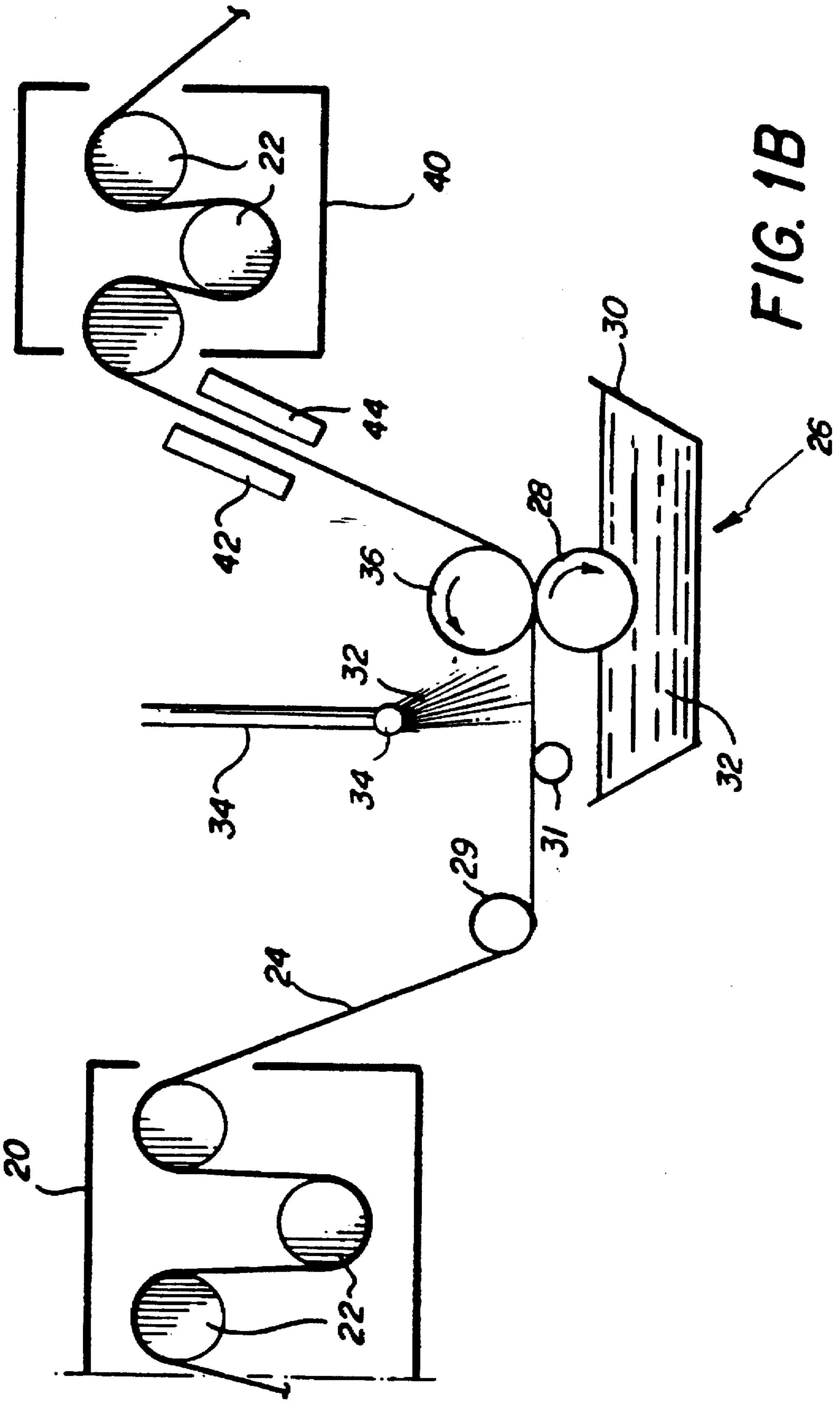
Figure 1C:
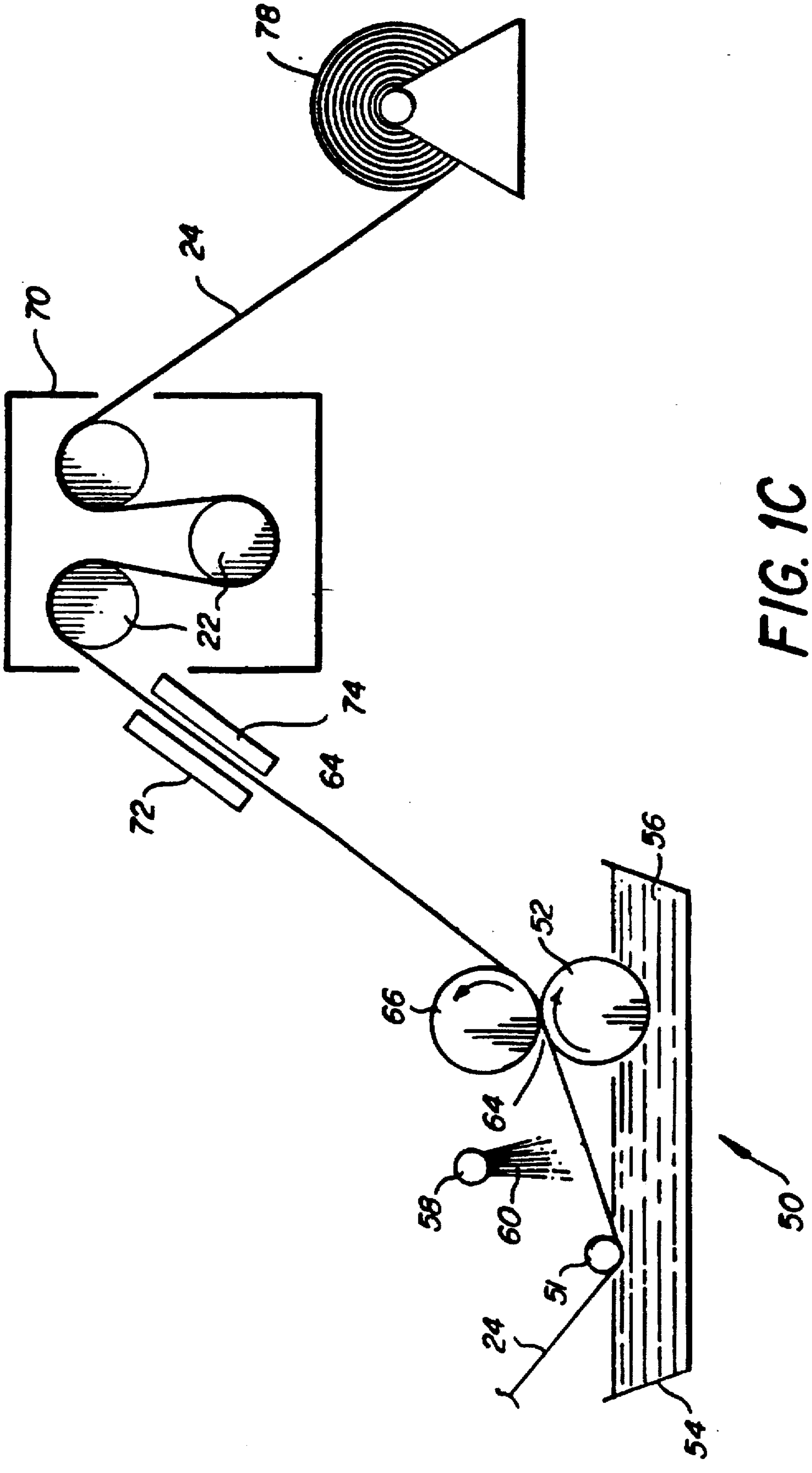

Illustrated schematically in FIG. 1A is a Fourdrinier paper-making machine 10 where a mixture of wood pulp and water is applied from head box 12 onto the wire belt 14. From the Fourdrinier paper-making machine, the paper as is conventional goes to the wet presses 18 and 19 and then into dryer 20 containing a series of heater drums 22, it being noted, that in a paper-making machine there would be a multiplicity of heated dryer drums 22, whereas in the drawing only a few are shown at each drying stage. After exiting the first dryers 20, as shown in FIG. 1B, the paper 24 passes into the first polyvinyl alcohol sizing apparatus 26 comprising roller or drum 28 and tank 30 containing the polyvinyl alcohol solution 32. The paper 24 has polyvinyl alcohol applied to the lower side by roller or drum 28 rotating in polyvinyl alcohol solution 32. Prior to entering the nip between rollers 28 and 36, the paper 24 passes turning roller 29 and support roller 31. The paper 24 also has polyvinyl alcohol solution applied to the upper surface by spray 32 from the perforated pipe 34. The nip of rollers 36 and 28 serves to aid in impregnation of polyvinyl alcohol into the paper 24 and also prevent excess polyvinyl alcohol polymer on the surface of the paper from being carried to the second dryer 40. Prior to entering the second dryer 40, the paper may optionally be subjected to non-contact dryers 42 and 44 that may be radiant or hot air dryers. Dryer 40 also contains a series of dryer drums 22. Radiant heaters 42 and 44, if used, serve to reduce the tendency for any polyvinyl alcohol solution on the surface to attach itself to the dryer drums and causing pits or scabs in the paper. After exiting from dryer 40, the paper having been once impregnated and passing through the second stage dryer 40 then enters, as illustrated in FIG. 1C, the second polyvinyl alcohol sizing apparatus 50 comprising rollers 51 and 52 and tub 54 containing the polyvinyl alcohol solution 56. This sizing station 50 is also provided with the perforated pipe 58 spraying polyvinyl alcohol solution 60 onto the upper surface of paper 24. Rolls 52 and 66 by pressure in the nip 64 serve to aid in impregnation of the polyvinyl alcohol into the paper, as well as prevent excess surface material from reaching the third stage dryer 70. It is most preferred that non-contact dryers 72 and 74 be utilized prior to the third stage drying in order to dry the surface to prevent adhesion of polyvinyl alcohol to dryer drums 22. It is also possible to utilize dryer drums with a release surface such as the fluorine substituted hydrocarbons (i.e., polytetrafluoride) to aid in polyvinyl alcohol release from the surface of the dry drum. After exiting third stage dryer 70, the impregnated substantially oxygen impermeable paper is normally calendered, by means not shown, and then wound up on roll 78.

Illustrated in FIG. 2 is an alternate means of polyvinyl alcohol impregnation. As illustrated in FIG. 2, the paper 24 passes below a perforated pipe applicator 80 dispensing polyvinyl alcohol solution spray 82 onto the upper surface of the paper. The lower surface of the paper has polyvinyl alcohol solution applied to it by roll 84 operating in opposition to roll 86. Roll 84 passes by hopper 88 that is filled with polyvinyl alcohol solution 90 which is applied to roll 84. Overflow from roll 84 is collected in pan 92 for removal and recycling by pipe 94. This alternate application system may be substituted for either first stage sizing 26 or second stage sizing 50 as illustrated in the FIG. 1 drawings.

The polyvinyl alcohol impregnated paper of the invention has a higher concentration of polyvinyl alcohol polymer nearer the surface of the paper as illustrated by the cross section of FIG. 3 where areas 100 and 102 near the surface of the paper have a greater polymer load than the center area 106. Wood fibers 104 are relatively evenly distributed throughout the paper. Illustrated in FIG. 4 is a photographic element 110 formed utilizing the photographic paper of the invention. The paper as illustrated has the conventional polyethylene layers 112 and 114 on each side of the paper. The photographic paper also contains a blue light sensitive layer 116, a green light sensitive layer 118, and a red light sensitive layer 120. The photographic element 110 is further provided with a protective surface layer 122, typically of gelatin. Ultraviolet light absorbers in the surface layer or below the surface cyan layer normally are utilized.

The polyvinyl alcohol utilized in the impregnation of the invention may be any polyvinyl alcohol that results in a substantially impermeable paper. Polyvinyl alcohol is formed by hydrolysis of vinyl acetate. Polyvinyl alcohol prior to use is soluble in water and available in powder or pellet form. The more fully hydrolyzed polyvinyl alcohols have higher water and humidity resistance. The molecular weight average may vary between above 13,000 and up to 200,000. The higher molecular weight materials have increased water resistance, adhesive strength, and viscosity. A preferred material has been found to be a medium molecular weight polyvinyl alcohol of about 99 percent hydrolysis, as this material provides reduced oxygen permeability of the paper.

The polyvinyl alcohol polymer is impregnated in any amount that provides substantial oxygen impermeability. Generally it is preferred that the pick-up range be between about 4 and about 11 weight percent of the dry paper weight for an effective barrier to oxygen infiltration and relatively low cost. A pick up of about 4 to 6 weight percent is preferred for low cost with good oxygen permeability properties. The impregnation of the invention results in a paper that does not have a polyvinyl alcohol layer above the surface but has polyvinyl alcohol concentrated near both surfaces of the paper. It has been found that the process of the invention with two applications or passes of the paper in polyvinyl alcohol solution with drying after each pass results in sufficient pick-up of polyvinyl alcohol to provide the oxygen impermeability desired. Generally the range of polyvinyl alcohol in the solution is between about 8 and about 12 weight percent with a preferred amount being about 9 to about 11 weight percent for adequate impregnation of the paper. The PVA sizing solution also generally contains up to 1 percent sodium chloride based on the PVA solids. The sodium chloride provides internal conductivity to the paper such that it is not susceptible to static electricity buildup. A preferred solution viscosity of the polyvinyl alcohol impregnation solution is between about 250 and about 350 centipoise at 120° F.

Impregnation of the polyvinyl alcohol into the paper is such that an oxygen impermeable (zone) is created on at least the side onto which the photographic emulsions will be placed. Generally, the PVA sizing as set forth above will result in a zone of substantially complete impregnation of at least the upper 40 microns on the emulsion side of the paper. Ordinarily the emulsion side is the side of the paper that was against the wire of the paper-making machine. The side of the paper that was against the wire during paper formation is called the wire side, and the other side of the paper is called the face side. The amount of impregnation of polyvinyl alcohol on the back side (face side) of the paper away from the emulsions is less critical, although substantial impregnation is considered necessary to prevent curl. Generally, conventional weight photographic paper has an overall thickness of about 200 microns, and the sizing method of the invention will result in face side impregnation of at least about 20 microns. It is preferred that impregnation be at least 50 microns on the emulsion (wire) side of the paper in order to provide an adequate oxygen barrier. The phrase "substantially complete impregnation" is intended to indicate that substantially all voids between wood fibers have been filled by the polyvinyl alcohol polymer.

The sizing operation also may apply fillers, pigment, brighteners, dyes, hardeners, and other addenda typically utilized in size solutions.

The non-contact drying immediately after polyvinyl alcohol impregnation serves to dry the surface of the paper to be non-tacky such that contact with the dryer drums does not cause adhesion of wet polymer to the dryer drums. Further, the non-contact drying serves to aid in concentration of polyvinyl alcohol nearer the surface of the paper such that oxygen impermeability results with less use of polyvinyl alcohol. The non-contact drying preferably removes at least about one-third of the water in the support.

It is preferred that the paper prior to any impregnation with polyvinyl alcohol be dried to below about 10 percent moisture and preferably below about 5 percent moisture for greater polyvinyl alcohol pick-up when dipped into the polyvinyl alcohol solution. Prior to the second station for polyvinyl alcohol application, it is preferred that water content be below about 5 percent and most preferably below about 3 percent for low variability in polyvinyl alcohol pick-up. It is particularly desirable that non-contact drying be carried out after the second polyvinyl alcohol solution application to the sheet, as there is a greater tendency for the polyvinyl alcohol solution at the surface to stick to the drying drums if it is tacky upon contact with them.

Generally the paper sheet that is impregnated with the polyvinyl alcohol may be of any desired basis weight. It is generally preferred that the paper sheet have a basis weight of between about 25 and about 50 lbs/1000 sq. ft to provide a conventional feel and handling to the impregnated paper. A heavier weight paper of up to 80 lbs/1000 sq. ft. may be preferred for display purposes.

The polyvinyl alcohol impregnated papers can be utilized in the formation of photographic elements which, after exposing and processing, generate colored images which are surprisingly stable to light. Furthermore, the images exhibit neutral fade to light; the yellow, magenta, and cyan image dyes fade at the same rate, thus prolonging the useful lifetime of the print. In a typical color print, the light stabilities of the yellow and magenta image dyes are usually inferior to the light stability of the cyan image dye leading to an objectionable non-neutral fade of the color print. For color prints formed from impregnated papers described in this invention, however, the light stabilities of the yellow and magenta image dyes are improved substantially, while the light stability of the cyan image dye remains largely unaffected leading to greater image stability and neutral color fade. The yellow and magenta image dyes which benefit from the impregnated supports are formed by the reaction of oxidized color development agents with 2- and 4-equivalent image couplers such as open-chain ketomethylenes, pyrazolones, pyrazolotriazoles, and pyrazolobenzimidazoles. Typically, such image couplers are ballasted for incorporation in high boiling coupler solvents.

Couplers which form magenta dyes upon reaction with oxidized color developing agents are described in such representative patents and publications as: U.S. Pat. Nos. 2,600,788; 2,369,489; 2,343,703; 2,311,082; 3,152,896; 3,519,429; 3,062,653; 2,908,573, and "Farbkuppler-eine Literaturubersicht," published in Agfa Mitteilungen, Band III, pp. 126–156 (1961).

Couplers which form yellow dyes upon reaction with oxidized color developing agents are described in such representative patents and publications as: U.S. Pat. Nos. 2,875,057; 2,407,210; 3,265,506; 2,298,443; 3,048,194; 3,447,928; 5,021,333, and "Farbkuppler-eine Literaturubersicht," published in Agfa Mitteilungen, Band III, pp. 112–126.

In addition, other image couplers which can be useful are described in the patents listed in *Research Disclosure*, December, 1989, Item No. 308119, paragraph VII D, the disclosure of which is incorporated herein by reference.

Another key element to enhancing the useful lifetime of a color print is the reduction or elimination of the yellow stain which can form on prolonged exposure to light. This can be accomplished by coating a sufficient quantity of an ultraviolet light absorber (UVA) in the photographic element. Typically the UVA's are substituted phenylbenzotriazoles which are described in such representative patents as U.S. Pat. Nos. 4,853,471; 4,790,959; 4,752,298; 4,973,701; 4,383,863; 4,447,511; and references listed therein. Specific UVA's described in this invention are shown in structures V, U, and R. The preferred UVA's are the liquid type to minimize crystallization and surface blooming problems observed with solid UVA's.

Various layers to convert the paper support into a light reflecting print material, such as silver halide emulsion layers, subbing layers, interlayers, and overcoat layers are provided onto the paper support of the invention. Also conventional polyethylene extrusion coated layers may be provided on the paper support. The silver halide emulsion employed in the elements of this invention can be either negative-working or positive-working. Suitable emulsions and their preparation are described in sections I and II of the *Research Disclosure*, December, 1978, Item No. 17643, published by Industrial Opportunities, Ltd., The Old Harbourmaster's, North Street, Emsworth, Hants, P010 7DD, England. The silver halide emulsions employed in the present invention preferably comprise silver chloride grains which are at least 80 mole percent silver chloride and the remainder silver bromide.

The following examples are intended to be illustrative and not exhaustive of the invention. Parts and percentages are by weight unless otherwise indicated.

EXAMPLE 1

(Control)

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamideepichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc. This support was extrusion coated on the emulsion-facing side with polyethylene containing 12.5% $TiO_2$, and other addenda at 5.6 lb/ksf coverage. The opposite side was extrusion coated with polyethylene at 6.0 lb/ksf coverage. This support is identified as Example 1.

EXAMPLES 2–21

Color photographic paper supports were prepared as Example 1, except they were surface sized with various PVA solutions instead of starch solutions as shown in Table 1. These polyvinyl alcohol (PVA) solutions were prepared by adding PVA, with and without NaCl, in water at temperatures less than 70° F. This mixture was then heated to a minimum of 190° F. and held at this temperature until the PVA was dissolved. The solution was then cooled to 150° F. before applying to the paper base. The method of application was a tub size vertical size press as in FIG. 1*c*, and the sheet was passed through the PVA solution. After drying to a moisture of 3% using steam-heated dryers, the said PVA size paper was PVA tub-sized with the same solution a second time. This method of processing is called two-station sizing. The dried paper was then calendered to an apparent density of 1.04 g/cc. The paper was then extrusion coated in the same manner as Example 1.

The PVA pickup was measured using a gravimetric technique and reported as weight % of bone dry sample weight.

Two values were measured to establish the oxygen barrier properties of the Example supports: 1) oxygen leak rate and 2) oxygen gas transmission rate ($O_2$ GTR). The $O_2$ GTR measurements were made according to ASTM D3985-81 on 50 cm2 extrusion coated samples with the side to be emulsion coated facing the chamber with the oxygen sensor, at 100° F. and approximately 65% RH using pure oxygen. The oxygen leak rate was measured, using the same apparatus and test conditions, as follows: Nitrogen gas was introduced as the carrier gas in both the upper and lower chambers. After a suitable amount of time (30–180 minutes) the oxygen sensor was inserted into the lower chamber exhaust stream. Once equilibrium was established, the rate of oxygen reaching the sensor was recorded as the oxygen leak rate. The oxygen leak rate thus represents the rate that oxygen is reaching the sensor from 1) outgassing of the sample, 2) leaks in the system, and 3) leaks through the edge of the paper and diffusion through the polyethylene layer. Following the oxygen leak rate measurement, pure oxygen was introduced into the upper chamber (non-sensor side), and $O_2$ GTR measurements carried out as described above. All oxygen leak rate and $O_2$ GTR measurement in this specification assume a sample coated with 5 to 10 lbs./1000 sq. ft. of polyethylene polymer on each side. Polyethylene polymer is a conventional polymer used in resin coated paper.

Examples 1–21 were sensitized with red, green, and blue sensitive layers and provided with UV absorbing and protective layers as in Table 2. The image stability results were obtained in the following manner:

Each of the examples was exposed through an optical step wedge to red light, to green light and to blue light to give separate cyan, magenta and yellow dye records after processing in standard Kodak RA4 chemicals (*Research Disclosure*, Vol. 308, p. 933, 1989).

Dye stability was measured by exposing the coatings to a high intensity xenon light source (50 Klux filtered with window glass) for 28 days and measuring the amount of density lost from an initial density of 1.0. The increase in yellow stain in the unexposed areas of the strips was also measured.

TABLE 1

| Example | PVA | % PVA Solids | % NACL | PVA Wt. % in Paper | $O_2$ Leak Rate | $O_2$ GTR | Magenta Fade |
|---|---|---|---|---|---|---|---|
| 1 | None | None | 0.5 | None | 400 | 160 | -.68 |
| 2 | G | 6 | 0 | 2.06 | 93.3 | 8.8 | -.61 |
| 3 | G | 6 | 0.5 | 2 | 103 | 11.7 | -.61 |
| 4 | C | 6 | 0 | 2.11 | 113 | 7.2 | -.63 |
| 5 | C | 6 | 0.5 | 2.3 | 103 | 7.8 | -.62 |
| 6 | G | 7 | 0 | 2.58 | 60 | 7.8 | -.62 |
| 7 | G | 7 | 0.5 | 3.11 | 92.1 | 4.12 | -.62 |
| 8 | C | 7 | 0 | 2.79 | 84.4 | 4.2 | -.61 |
| 9 | C | 7 | 0.5 | 2.85 | 68.5 | 7.5 | -.60 |
| 10 | G | 9 | 0 | 4.24 | 23.2 | 0.6 | -.39 |
| 11 | G | 9 | 0.5 | 3.67 | 37 | 1.7 | -.48 |
| 12 | C | 9 | 0 | 3.82 | 44.9 | 3.4 | -.49 |
| 13 | C | 9 | 0.5 | 4.1 | 53.5 | 2.1 | -.54 |
| 14 | G | 10 | 0 | 4.11 | 14.6 | 0.1 | -.35 |
| 15 | G | 10 | 0.5 | 4.91 | 20 | 0.1 | -.33 |
| 16 | C | 10 | 0 | 5.16 | 16.1 | 0.1 | -.43 |
| 17 | C | 10 | 0.5 | 4.18 | 7.8 | 0.1 | -.33 |
| 18 | G | 11 | 0 | 6.52 | 5.5 | 0.1 | -.33 |
| 19 | G | 11 | 0.5 | 5.38 | 24.3 | 0.1 | -.44 |
| 20 | C | 11 | 0 | 4.49 | 23.6 | 1.2 | -.43 |
| 21 | C | 11 | 0.5 | 5.64 | 21.8 | 0.16 | -.39 |

G represents PVA with viscosity of 27–32 cps @4% water solution, 20° C., 99%+ hydrolyzed.

C represents PVA with viscosity of 23–27 cps (4% aq at 20° C.) and a hydrolysis of 99%+.

$O_2$ leak rate and $O_2$ GTR are reported in cc/m$^2$/day @1 atm.

From Table 1 the magenta image stability results shows that 2 passes through a PVA solution containing solids of about 9% is required for significant improvement. This corresponds to greater than about 3.5 weight % and preferably greater than 4 weight percent of PVA in paper base. Furthermore, it can be seen that $O_2$ barrier properties correlate well with image stability. For significant image stability improvement, an $O_2$ leak rate of less than about 25 and $O_2$ GTR less than about 1 are preferred. Also, Table 1 shows that image stability is not affected by the addition of NaCl to the PVA sizing solution.

Example 19 was analyzed by the Step-scan Interferometry/Photoacoustic technique, and it was found that on the wire side of the paper, the first about 50 microns of the paper was substantially fully impregnated with polyvinyl alcohol. The face side was found to be substantially fully impregnated to a depth of about 25 microns. The overall paper thickness was about 200 microns. The Step-scan Interferometry/Photoacoustic technique used for the determination of the PVA penetration into the paper is generally described in P. R. Griffiths and J. A. de Haseth, "Fourier Transform Intrared Spectrometry," John Wiley and Sons, New York, 1986; R. M. Dittmar, J. L. Chao, and R. A. Palmer, "Applied Spectroscopy", Vol. 45, No. 7, 1991, pp. 1104–1110; and A. Rosencwaig, "Photoacoustics and Photoacoustic Spectroscopy," John Wiley and Sons, New York, 1980.

EXAMPLE 22

(Control)

A conventional type color photographic material was prepared having the component layers as specified in Table 2.

TABLE 2

Polyethylene-coated conventional paper support

| Layer No. | Layer | Coated Silver mg/ft$^2$ | Coupler | Gel mg/ft$^2$ | UV Absorber | UV Amount mg/ft$^2$ | Coupler Laydown mg/ft$^2$ |
|---|---|---|---|---|---|---|---|
| 7 | Protective | — | — | 125 | — | — | — |
| 6 | UV layer | — | — | 65 | V + U | 35 | — |
| 5 | Red Sensitive | 30 | Y | 100 | — | — | 39 |
| 4 | 2nd interlayer | — | — | 65 | V + U | 35 | — |
| 3 | Green sensitive | 30 | W | 115 | — | — | 39 |
| 2 | 1st interlayer | — | — | 70 | — | — | — |
| 1 | Blue sensitive | 27 | Z | 140 | — | — | 100 |

Structures of the compounds are shown below. Coupler dispersions were prepared in a standard manner using high boiling solvents.

EXAMPLE 23

Example 23 was prepared in the same way as Example 22 except that the conventional paper support was replaced by the polyvinyl alcohol (PVA) impregnated support of Example 15 of this invention. The PVA support has a basis weight (bone dry weight) of 50 lbs/1000 sq. ft. meter and is about 5 weight per cent PVA.

EXAMPLE 24

Example 24 is prepared in the same way as Example 23 except that the gel level in layers 4 and 6 was increased to 150 mg, and the UV level in layers 4 and 6 was increased to 80 mg.

Coupler Y

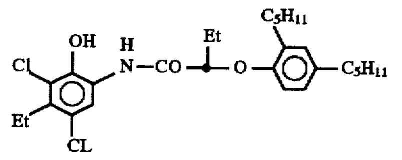

Coupler W

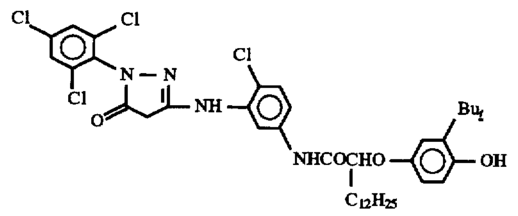

Coupler Z

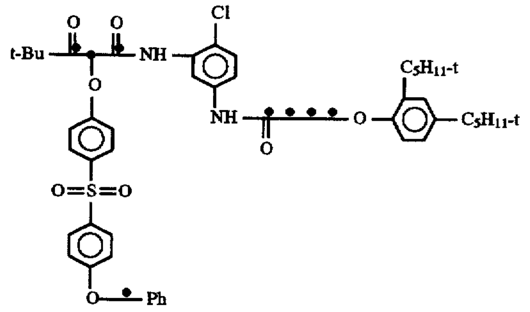

UV Absorber V

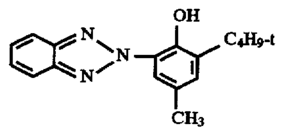

UV Absorber U

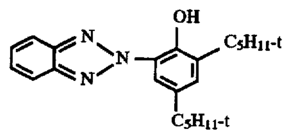

UV Absorber R

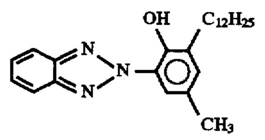

EXAMPLE 25

Example 25 is prepared with the structure shown in Table 3.

TABLE 3

Conventional Polyethylene-coated paper support

| Layer No | Layer | Coated Silver mg/ft$^2$ | Coupler | Gel mg/ft$^2$ | UV Absorber | UV Amount mg/ft$^2$ |
|---|---|---|---|---|---|---|
| 7 | Protective | — | — | 125 | — | — |
| 6 | UV layer | — | — | 95 | R | 65 |
| 5 | Red Sensitive | 30 | Y | 100 | — | — |
| 4 | 2nd interlayer | — | — | 95 | R | 65 |
| 3 | Green sensitive | 30 | W | 115 | — | — |
| 2 | 1st interlayer | — | — | 70 | — | — |
| 1 | Blue sensitive | 27 | Z | 140 | — | — |

EXAMPLE 26

Example 26 is prepared in the same way as Example 25 except that the conventional paper support was replaced by the PVA support of Example 15.

The coatings of Examples 22–26 were processed and faded as described in Examples 1–22. Results are shown in Table 4.

TABLE 4

| Example | Yellow Fade | Magenta Fade | Cyan Fade | Stain |
|---|---|---|---|---|
| 22 | −0.58 | −0.78 | −0.30 | 0.11 |
| 23 | −0.32 | −0.44 | −0.30 | 0.05 |
| 24 | −0.25 | −0.34 | −0.30 | 0.00 |
| 25 | −0.59 | −0.74 | −0.30 | 0.02 |
| 26 | −0.30 | −0.32 | −0.32 | 0.00 |

From the data in Table 4 it is apparent that the examples containing the PVA impregnated support of the invention show markedly improved stability of the magenta and yellow dyes while the stability of the cyan dye is unaffected. This is an improvement, as the cyan dye previously was more stable and prevented even fade. The data also indicates that a further improvement in dye stability and staining is obtained by combining the support of the invention with increased levels of UV absorber and gelatin in the layers containing the UV absorber.

EXAMPLE 27A

A color photographic paper containing a pyazolotriazole type magenta coupler (Coupler X) and silver halide emulsion is coated on an invention support as in Example 15. This photographic paper shows improved properties when exposed for extended duration to a high intensity light source when compared with a conventional (not PVA impregnated) support.

Dispersions of this coupler were prepared in a conventional manner using the high boiling solvent (S) and stabilizing addenda (ST).

Aqueous dispersions were coated in a gelatin matrix in a conventional color paper structure with coupler Y as the cyan coupler and coupler Z as the yellow coupler. A UV absorbing layer using compounds U and V was also incorporated in this structure. The photographic paper has the following structure as in Table 5:

TABLE 5

| Layer No | Layer | Coated Silver mg/ft² | Coupler | Gel mg/ft² | UV Absor-ber | UV Amount mg/ft² |
|---|---|---|---|---|---|---|
| PVA Impregnated Support | | | | | | |
| 7 | Protective | — | — | 125 | — | — |
| 6 | UV layer | — | — | 65 | V + U | 35 |
| 5 | Red Sensitive | 30 | Y | 100 | — | — |
| 4 | 2nd interlayer | — | — | 65 | V + U | 35 |
| 3 | Green sensitive | 12 | X | 115 | — | — |
| 2 | 1st interlayer | — | — | 70 | — | — |
| 1 | Blue sensitive | 27 | Z | 140 | — | — |

EXAMPLE 27B (Control)

Example 27B is prepared in the same way as Example 27A except that the invention paper support was replaced by the conventional polyethylene-coated paper support.

The examples were exposed, processed, and faded as described earlier, and the magenta dye fade results are shown in Table 6. The data show the greatly improved light stability position obtained by coating coupler X on the PVA impregnated support of this invention.

TABLE 6

| Example | Paper Support | Magenta Fade |
|---|---|---|
| 27B | Standard | −0.49 |
| 27A | PVA-Impregnated | −0.19 |

Coupler X

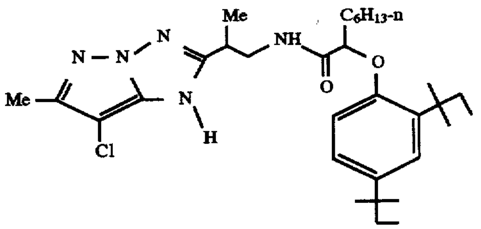

Coupler Y

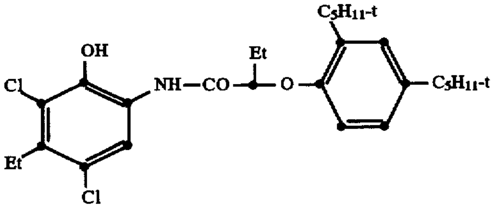

-continued

Coupler Z

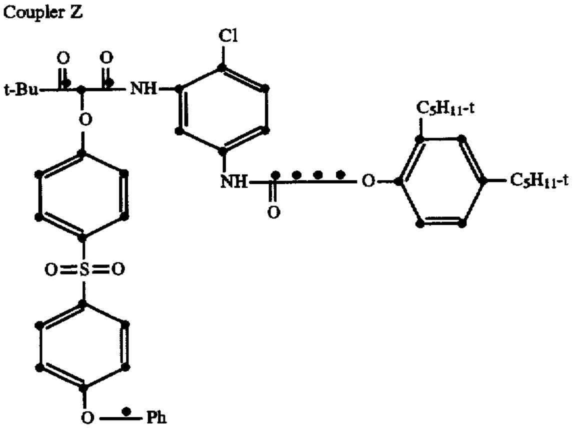

UV Absorber V

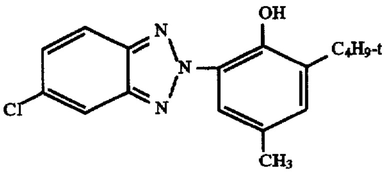

UV Absorber U

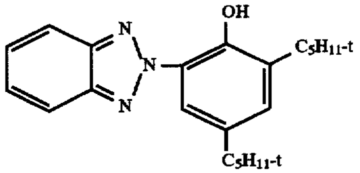

Solvent S

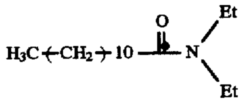

N,N-Diethyl lauramide

Stabilizer ST

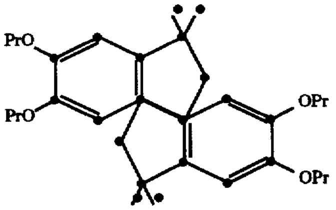

EXAMPLES 28 AND 29

Examples 28 and 29 were prepared using the same method and composition as Example 15 except that the number of polyvinyl alcohol sizing applications were varied, see Table 7.

TABLE 7

| Example | No. of PVA Applications | $O_2$ Leak Rate | $O_2$ GTR |
|---|---|---|---|
| 28 | 1 | 272 | 24.7 |
| 29 | 2 | 19.7 | 0.21 |

Table 7 shows that a single polyvinyl alcohol sizing application cannot provide the oxygen barrier properties expected to improve image stability significantly. However, the invention paper, Example 29, with 2 passes through a polyvinyl alcohol sizing solution does provide a support with oxygen barrier properties that would improve image stability significantly.

EXAMPLES 30 AND 31

(Control)

Example 30 was produced using the same formulation and process as Example 15.

To form Example 31 a conventional cornstarch sized paper was treated on one side with a 4.4 weight percent solution made using a medium viscosity (26–30 centipoise at 4% water solution and 20° C.) super hydrolyzed (>99%) polyvinyl alcohol. The coating of the aqueous polyvinyl alcohol was by a slide hopper coating method resulting in a 3.5 gram/$m^2$ polyvinyl alcohol layer. This support was then extrusion coated with polyethylene as in Example 1, with the pigmented resin placed on the side having the polyvinyl alcohol layer.

Examples 30 and 31 were then sensitized with a photographic emulsion in the same manner as Example 22.

The curl propensity of Examples 22, 30, and 31 are compared in Table 8. The CURL was measured by cutting an 8.5 cm disk from the sensitized sample either before (pre-process) or after (post-process) development. The disk is placed in a 50% RH room for conditioning for a minimum of 8 hours. The disk is then transferred to a 20% RH conditioning room, placed emulsion side up, and left for 7 days. After 7 days, the radius of curvature (r), in inches, is measured. The CURL value is then calculated by the formula CURL=100/r. If the curl is towards the emulsion, CURL is reported as a positive number; if the curl is toward the support side, the CURL is reported as a negative number. After the 20% RH measurement, the sample is placed in a 50% RH environment for 7 days, and the testing repeated. This process is then repeated at 70% RH conditions.

TABLE 8

| | Pre-Process CURL | | | Post-Process CURL | | |
|---|---|---|---|---|---|---|
| Example | 20% RH | 50% RH | 70% RH | 20% RH | 50% RH | 70% RH |
| 22 | +26 | +6 | −9 | +22 | +2 | −10 |
| 30 | +21 | +6 | −7 | +16 | −4 | −10 |
| 31 | +42 | +18 | +12 | +56 | +12 | +6 |

Table 8 clearly shows that the photographic paper of this invention, Example 30, has very similar curl behavior as the cornstarch sized control of Example 22. However, Example 31, since it has a discrete layer of polyvinyl alcohol on one side of the paper, has much greater propensity for curl at all humidity conditions tested. Example 31 support would, therefore, require significant curl balancing to make it acceptable as a photographic support, thus adding cost.

The invention has been described in detail with particular reference to preferred embodiments thereof, but it will be understood that variations and modifications can be effected within the spirit and scope of the invention.

We claim:

1. A paper, having a wire side and a face side, said paper comprising wood fiber, and polyvinyl alcohol with the proviso that said polyvinyl alcohol is located in heavier concentration near the surface of said paper and wherein the wire side of said paper is substantially completely impregnated with polyvinyl alcohol to a depth of greater than 40 microns, the face side is impregnated to a depth of greater than 20 microns.

2. The paper of claim 1 wherein said paper comprises between about 4 and about 6 percent by weight polyvinyl alcohol.

3. The paper of claim 1 wherein said wood fiber comprises 50 to 100 percent by weight hardwood and 0 to about 50 percent by weight softwood.

4. The paper of claim 1 wherein said paper has an oxygen leak rate of less than about 25.

5. The paper of claim 1 wherein said paper has an $O_2$ GTR rate of less than about 1.

6. The paper of claim 1 wherein said polyvinyl alcohol impregnates greater than 40 microns of at least one surface of said paper.

7. The paper of claim 1 wherein said polyvinyl alcohol substantially completely impregnates greater than 50 microns into at least one surface of said paper.

8. The paper of claim 1 wherein said paper is about 200 microns thick.

9. The paper of claim 1 wherein said paper has a basis weight of at least about 25 lbs. per square foot.

* * * * *